(12) United States Patent
Kirkpatrick et al.

(10) Patent No.: US 7,353,248 B1
(45) Date of Patent: Apr. 1, 2008

(54) APPLICATION SERVER AND METHOD TO PERFORM HIERARCHICAL CONFIGURABLE DATA VALIDATION

(75) Inventors: Mark A. Kirkpatrick, Conyers, GA (US); John A. Strohmeyer, Norcross, GA (US); Darin J. Morrow, Acworth, GA (US); Michael S. Bass, Lawrenceville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 548 days.

(21) Appl. No.: 09/916,330

(22) Filed: Jul. 30, 2001

(51) Int. Cl.
*G06F 15/16* (2006.01)
*G06F 7/00* (2006.01)

(52) U.S. Cl. .................. 709/203; 709/200; 709/201; 709/202; 707/100

(58) Field of Classification Search ........ 709/217–228, 709/201–212, 230–237, 246, 249, 248; 707/4, 707/10, 6, 102, 100, 1, 200; 705/9; 719/332
See application file for complete search history.

(56) References Cited

U.S. PATENT DOCUMENTS

| | | | | |
|---|---|---|---|---|
| 5,388,255 A | * | 2/1995 | Pytlik et al. | 707/4 |
| 5,732,218 A | * | 3/1998 | Bland et al. | 709/224 |
| 5,761,668 A | * | 6/1998 | Adamchick | 707/101 |
| 5,813,017 A | * | 9/1998 | Morris | 707/204 |
| 5,898,836 A | * | 4/1999 | Freivald et al. | 709/218 |
| 5,943,662 A | * | 8/1999 | Baba et al. | 706/23 |
| 5,958,010 A | * | 9/1999 | Agarwal et al. | 709/224 |
| 5,958,016 A | * | 9/1999 | Chang et al. | 709/229 |
| 5,978,842 A | * | 11/1999 | Noble et al. | 709/218 |
| 6,004,276 A | * | 12/1999 | Wright et al. | 600/508 |
| 6,038,542 A | * | 3/2000 | Ruckdashel | 705/9 |
| 6,044,372 A | * | 3/2000 | Rothfus et al. | 707/10 |
| 6,047,280 A | * | 4/2000 | Ashby et al. | 707/2 |
| 6,047,323 A | | 4/2000 | Krause | |
| 6,078,918 A | * | 6/2000 | Allen et al. | 707/6 |
| 6,081,517 A | | 6/2000 | Liu | |
| 6,084,877 A | | 7/2000 | Egbert et al. | |
| 6,085,030 A | * | 7/2000 | Whitehead et al. | 709/203 |
| 6,085,222 A | * | 7/2000 | Fujino et al. | 709/202 |
| 6,157,634 A | | 12/2000 | Mehta | |
| 6,163,776 A | * | 12/2000 | Periwal | 707/4 |
| 6,202,096 B1 | | 3/2001 | Williams | |
| 6,226,637 B1 | * | 5/2001 | Carey et al. | 707/4 |
| 6,304,647 B1 | | 10/2001 | Frost | |
| 6,411,697 B1 | | 6/2002 | Creamer | |
| 6,453,356 B1 | | 9/2002 | Sheard | |
| 6,460,042 B1 | | 10/2002 | Hitchcock | |
| 6,463,528 B1 | | 10/2002 | Rajakarunanayake | |
| 6,476,833 B1 | * | 11/2002 | Moshfeghi | 345/854 |
| 6,484,214 B1 | * | 11/2002 | Sundermier | 719/332 |
| 6,499,017 B1 | | 12/2002 | Feibelman | |
| 6,513,038 B1 | * | 1/2003 | Hasegawa et al. | 707/7 |
| 6,526,423 B2 | | 2/2003 | Zawsdzki et al. | |
| 6,546,095 B1 | | 4/2003 | Iverson | |
| 6,625,274 B1 | | 9/2003 | Hoffpauir et al. | |

(Continued)

*Primary Examiner*—Saleh Najjar
*Assistant Examiner*—Asad M Nawaz
(74) *Attorney, Agent, or Firm*—Withers & Keys, LLC

(57) ABSTRACT

Clients using standard software protocols may access a validation application server for validation service on data via a number of methods including Internet applications, a Java RMI server, a CORBA gateway server and graphical screen interphase applications. The validation server provides validation service on the data based on dynamically-maintained, centrally-stored validation functions.

39 Claims, 2 Drawing Sheets

U.S. PATENT DOCUMENTS

| | | |
|---|---|---|
| 6,629,098 B2 | 9/2003 | Mc George |
| 6,665,662 B1 * | 12/2003 | Kirkwood et al. .............. 707/3 |
| 6,697,824 B1 * | 2/2004 | Bowman-Amuah ......... 709/229 |
| 6,697,849 B1 * | 2/2004 | Carlson ...................... 709/219 |
| 6,718,332 B1 * | 4/2004 | Sitaraman et al. .......... 707/102 |
| 6,751,302 B1 | 6/2004 | Hoang |
| 6,757,720 B1 | 6/2004 | Weschler, Jr. |
| 6,782,508 B1 | 8/2004 | Bahrs |
| 6,801,920 B1 | 10/2004 | Wischinski |
| 6,816,864 B2 * | 11/2004 | Deuser et al. .............. 707/100 |
| 6,839,748 B1 * | 1/2005 | Allavarpu et al. .......... 709/223 |
| 6,915,454 B1 * | 7/2005 | Moore et al. ................. 714/38 |
| 6,917,944 B1 | 7/2005 | Prasad et al. |
| 6,941,326 B2 | 9/2005 | Kadyk et al. |
| 6,961,760 B2 * | 11/2005 | Li et al. ..................... 709/219 |
| 6,999,570 B2 | 2/2006 | Alcott |
| 7,000,236 B2 | 2/2006 | Kirkpatrick |
| 7,062,452 B1 | 6/2006 | Lotvin |
| 7,089,560 B1 | 8/2006 | Uhler |
| 7,191,209 B1 * | 3/2007 | Kirkpatrick et al. ........ 709/203 |
| 2001/0037361 A1 * | 11/2001 | Croy .......................... 709/203 |
| 2001/0047279 A1 | 11/2001 | Gargone |
| 2002/0019827 A1 | 2/2002 | Shiman et al. |
| 2003/0046370 A1 * | 3/2003 | Courtney .................... 709/220 |

* cited by examiner

APPLICATION SERVER AND METHOD TO PERFORM HIERARCHICAL CONFIGURABLE DATA VALIDATION

FIELD OF THE INVENTION

The present invention relates to an application properties server and method to provide software validation service to clients. More particularly, the present invention relates to a system and a method for allowing applications software using established computer network protocols to execute hierarchical configurable data validation from a centralized database.

BACKGROUND OF THE INVENTION

Computer applications ("application servers") commonly require input data to be validated prior to additional processing. The validation requirements are often dynamic. For example, validation requirements for a telephone service provider's software applications may change based on changed customer service availability, newly available or no longer available customer services, the number of customer requests in a given period, the acceptable times for requests, the version of the software running, etc.

In today's networked environment, application servers run a variety of different software protocols (e.g., J2EE Containers with CORBA orbs, J2EE Containers with RMI) and typically require a number of different data validations before performing other functions. As a result, a need exists for an application server that can dynamically maintain, process and efficiently run validations for a plurality of clients running different software protocols simultaneously.

Further, because validation needs often change, a need exists for a validation application server that can manipulate the validations run on specific fields of client validation requests without requiring extensive changes in software. Most computer software applications use configuration variables to alter its behavior without the need for regenerating code. This is most often done using text files. In today's Internet and networked environments this can cause administrative problems. This is largely because the same software application may be running on several machines, in several locations. Thus, in order to uniformly alter the behavior of all software applications, or clients, all files need to be accessible by the text files. This can cause great expense and significant administration problems. For one thing, security considerations often dictate that a text file employed to alter a software application must be on the same machine that is running the code. Therefore, the configuration file often must be replicated over several machines. If changes are made on one software application, they must also be made on all of the other applications. Errors can occur if the changes are not made consistently on all of the applications. Accordingly, a further need exists for an application server that will allow application server administrators to update the various validations done on fields of data without a new release of code.

SUMMARY OF THE INVENTION

The present invention is a system and method wherein application servers using standard software protocols may access a centralized, maintainable, validation application server coupled to a data schema for validation services on data. The client servers access the validation server via a number of methods including Internet applications, a Java RMI server, a CORBA gateway server and graphical screen interphase applications. The validation application server provides validation services on the data based on dynamically maintained, centrally stored, validation functions, and returns validation notifications to the client servers.

DETAILED DESCRIPTION OF THE INVENTION

Figure 1:
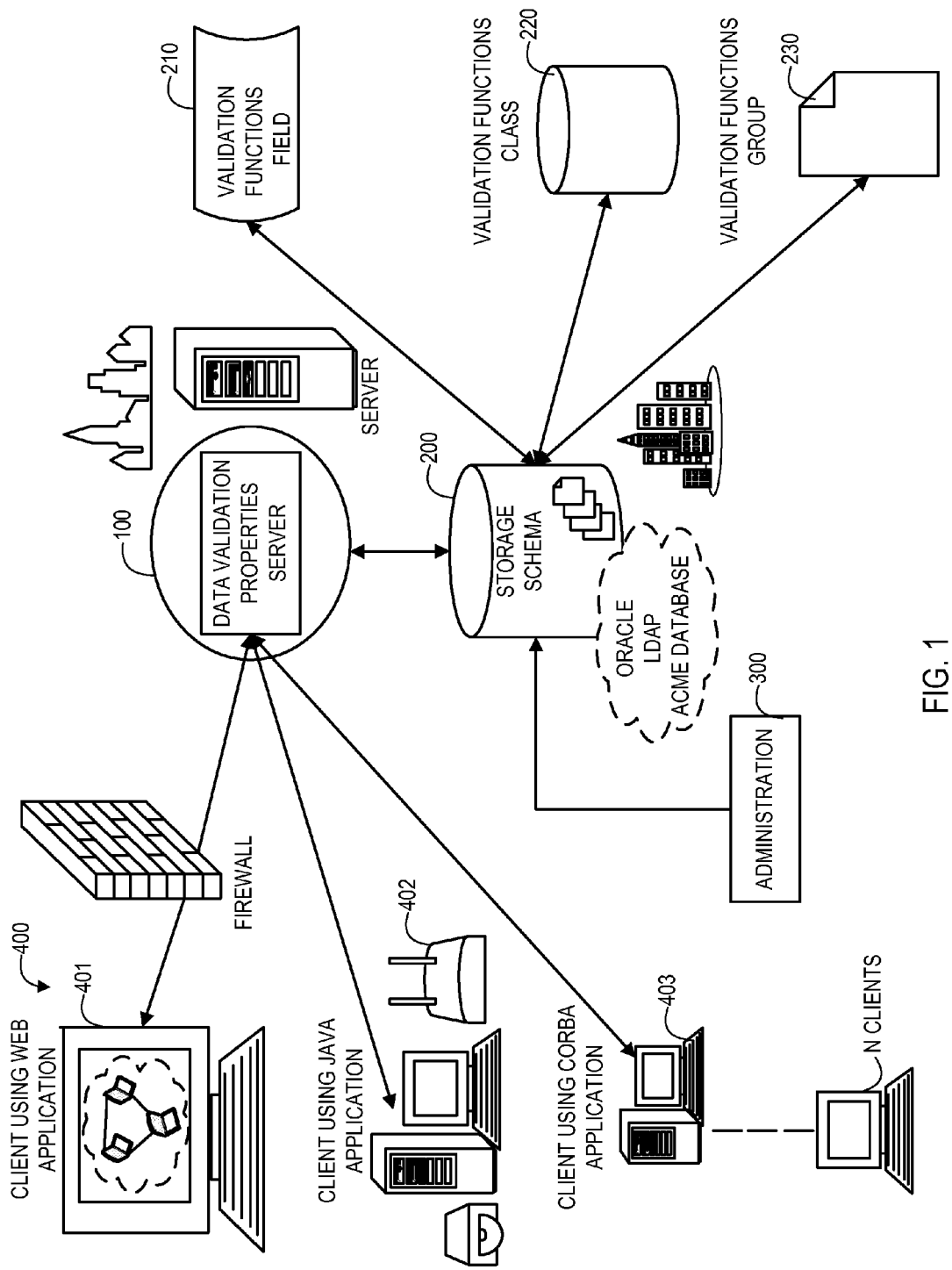
FIG. 1 is a schematic diagram of an overview of an embodiment of the present invention.

As shown in FIG. 1, the present invention preferably includes an application properties server 100 for receiving validation requests from clients 400 and a storage mass 200 for storing centralized validation functions and data. As will be appreciated by those skilled in the art, validation properties application server 100 may be represented by one or more servers, even if located in different geographic locations. In the preferred embodiment of the present invention, depending on system resources, a number n of clients 400 may access the validation application server 100 for validation service via a number of methods including, for example, clients 401 using Internet applications, clients 402 using Java via a Java RMI server (not shown), clients 403 using CORBA via a CORBA gateway server (not shown), and graphical screen interphase applications.

Figure 2:
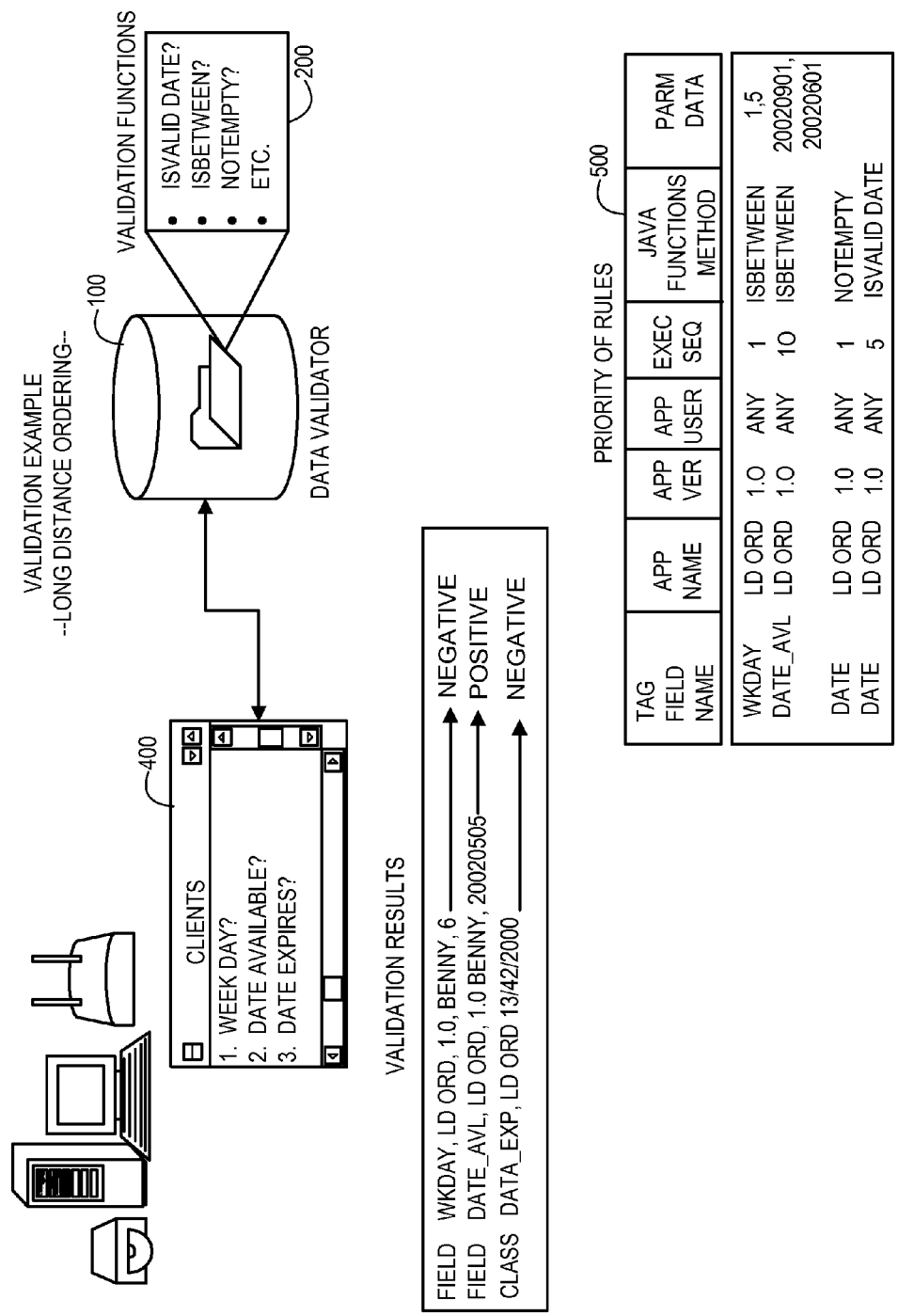
FIG. 2 is a schematic diagram illustrating a specific embodiment of the present invention.

Referring to FIG. 1, according to an embodiment of the present invention, clients serve validation requests to the application server 100 which then accesses storage mass 200 using a hierarchical rule-based system 500 (FIG. 2). The validation application server 100 identifies and accesses the stored data and performs validation services associated with the validation requests. Preferably tables of validation functions, or rules, implement the validation data, which may preferably be stored in a storage mass such as an Oracle database. As described hereinbelow, by utilizing a table-based storage system, the application server of the present invention can efficiently and dynamically perform validation services on validation requests provided by a number n of clients.

Referring to FIG. 1, client 401 requests validated services related to data for, for example, long distance ordering information such as valid installation dates, available installation dates, or the allowable number of telephones. Storage mass 200 contains a plurality of data tables 210, 220, 230, . . . that will be described below. In response to client 401's validation requests, validation properties server 100 provides validation services to client 401 by accessing storage mass 200. Similarly, and preferably at the same time, a client 402 running a Java application program can use RMI via an RMI interface to interact with properties server 100 and validation of data based on information stored in storage mass 200. Finally, a third client, running a CORBA application 403 may request validation service on data related to, for example, Wireless Ordering. Again, validation properties server 100 accesses storage mass 200 and performs a validation service for client 403.

The validation data may be stored in a format such as Oracle or Lightweight Directory Access Protocol ("LDAP"). The information may be stored in another location or may be shared with other businesses. Preferably, validation data is stored in a table based system, more preferably in an Oracle database 200. As will be appreciated by those skilled in the art, use of an Oracle database allows for good performance, data integrity, and a wide variety of data management tools to administer the configuration data via an administration system 300. As will also be appreciated by those skilled in the art, Oracle database 200 may be represented by two or more databases located in separate geographical locations.

FIG. 2 depicts a more specific embodiment and example of the present invention, wherein the database 200 consists of a table-based system of rules organized into three hierarchically-organized views: FIELD, CLASS and GLOBAL. The three views allow a hierarchical management of the validations to be performed on data fields received from the client 400 server. In the preferred embodiment, the three views are FIELD, CLASS and GLOBAL in order of precedence. Of course, the number of views may vary depending on the client's needs.

As will be appreciated, each of the FIELD, CLASS and GLOBAL views has an execution sequence. Utilizing an execution sequence, which provides a layered approach, and thereby a hierarchical approach to performing validation requests, yields efficient results. According to the execution sequence for a particular view, several validation methods can be orderly executed on data for a matching field.

Before providing a specific example, the FIELD, CLASS and GLOBAL views are explained. In the preferred embodiment, the FIELD view is the highest priority validation. Preferably, for efficiency reasons, the least amount of data is sorted by the FIELD view. If a FIELD name for the associated application is in this table that entry will dictate the validations to be performed.

As an example of one embodiment of the present invention, referring to Table 1, the FIELD view contains the following data:

TABLE 1

| Column Name | Description |
| --- | --- |
| Tag Name | Name of data field used to locate validations |
| Application Name | Application tag to differentiate field names from those in other applications. |
| Application Version | Application tag to differentiate field names from those in other versions of the same application. |
| Application User | Application tag to differentiate field names from those in other instances of an application and version for different users. |
| Execution Sequence | A number designating the order of execution for the 1 or more validation methods for an item meeting the previous criteria. |
| Validation Method | The name of an existing Java method to be called with the value of the field to be validated. |
| Validation Values ("PARM Data") | Used by the validation method to compare to the data value. Presence determined by validation method. Items are separated by a predefined character (generally a ",") (e.g., 1,5; 20020901, 20020601) |
| Comment | Description of desired rule. Used for documentation only. |

In the preferred embodiment, the CLASS view is the second-highest priority validation. The CLASS view is used if there is no matching entry in the FIELD view. In such a case, a lookup will be performed by the validation application server 100 on the passed field name. The validation application server 100 will check for class names that match the first part of the field name. An illustrative example is discussed below to describe the FIELD and CLASS view hierarchy.

EXAMPLE 1

No Address_Data

A client application server 400 accesses the validation application server 100 with the field name of Address_1. However, in reality, the user has input no Address_1 data. Thus, there is no Address_1 item in the FIELD view. There is, however, an entry in the class view for Address. Therefore the validation functions for the class Address will be performed on the data in Address_1.

As an example of one embodiment of the present invention, referring to Table 2, the CLASS view contains the following data:

TABLE 2

| Column Name | Description |
| --- | --- |
| Tag Name | A generic string that will be used to match the field's name up to a defined character. (Date_1 will match up with Date) |
| Application Name | Application tag to differentiate field names from those in other applications. |
| Application Version | Application tag to differentiate field names from those in other versions of the same application. |
| Application User | Application tag to differentiate field names from those in other instances of an application and version for different users. |
| Execution Sequence | A number designating the order of execution for the 1 or more validation methods for an item meeting the previous criteria. |
| Validation Method | The name of an existing Java method to be called with the value of the field to be validated. |
| Validation Value 1 ("PARM Data") | Used by the validation method to compare to the data value. Presence determined by validation method. Items are separated by a predefined character (generally a ",") |
| Comment | Description of desired rule. Used for documentation only. |

Finally, in the preferred embodiment, the GLOBAL view is the most generic method of performing validation functions. Any field that does not have an entry in either the FIELD or CLASS view will be validated with the methods dictated for the associated application information. As this view is generic, preferably the most data is handled at the GLOBAL level, thereby improving efficiency. An example is discussed below describing the hierarchy between the FIELD, CLASS and GLOBAL views.

EXAMPLE 2

The Field Name is Residence_2

There is no Residence_2 item in the FIELD view. There is no Residence entry in the CLASS view. There is, however, a GLOBAL validation function called NotEmpty in the GLOBAL table for the application 400 (name, version and user) that requires data validation. Therefore the data for Residence_2 will be checked to see if it is not an empty field and validation properties server 100 will provide a positive return to client 400.

In the preferred embodiment, each of the FIELD, CLASS and GLOBAL views has an execution sequence for the associated validation functions that exist for that view. This provides a layered approach to validation. An example for describing the execution sequence is described below.

EXAMPLE 3

Field Name: Date_1

The FIELD table is as follows:

| Tag Name | Application Name | Application Version | Application User | Execution Sequence | Validation Method | Validation Values |
|---|---|---|---|---|---|---|
| ClassOfService | Appl1 | 001 | EMRS1 | 1 | IsMember | 0,1,2,3,4,5,6,7,8,9,0,A,F |
| DayOfWeek | Appl1 | 001 | EMRS1 | 1 | IsBetween | 1,5 |

In this illustrative example, there is no match for Field Name: Date_1 in the FIELD view. Here, there are only validation executions in the FIELD view table for ClassOf-Service and DayOfWeek. However, the validation properties server 100 recognizes that the CLASS view table has a matching item called Date. The CLASS view table has three entries (i.e., three validation methods) to be performed. The CLASS view table is as follows:

| Tag Name | Application Name | Application Version | Application User | Execution Sequence | Validation Method | Validation Value 1 |
|---|---|---|---|---|---|---|
| Date | Appl1 | 001 | EMRSI | 10 | IsBetween | Jan. 1, 2000, Dec. 31, 2002 |
| Date | Appl1 | 001 | EMRSI | 1 | NotEmpty | |
| Date | Appl1 | 001 | EMRSI | 5 | IsValidDate | |

In this exemplary example, based on the Execution Sequence of "1", the date is first checked for a non-empty field by validation method "NotEmpty." If it passes, based on the next rule, which has an execution sequence of "5", the date will be checked to see if it is a valid date format—using the IsValidDate method. If the date data passes that method, the date will be checked to make sure it is between Jan. 1, 2000 and Dec. 31, 2002 with the IsBetween method based on the Validation Value 1 PARM data in the CLASS view table. If the date data passes, then the data will be considered valid and the server 100 will return a positive return to the requesting client application server 400 signifying valid data. This example illustrates a "CLASS" level validation.

FIG. 2 depicts an exemplary embodiment of the present invention. In this example, client application server Long Distance Delivery Ordering ("LD ORD") 400 seeks to validate data input by a customer for the weekday, the date available and the date of expiration related to a desired telephone service. Using a known software application protocol, application server 400 sends validation requests related to the data input by the customer to the validation application server 100. In this example, the weekday data is tag named "WkDay." Accordingly, the validation application server 100 generates an instruction to call the FIELD view table from the storage medium 200 for WkDay. In this example, the application server 100 automatically follows a priority of rules 500. Here, there is only one rule, i.e., one Java Function, for wkDay. As shown in FIG. 2, the Java method associated with the WkDay rule is an IsBetween method. Accordingly, the validation server 100 checks to see if the input data is between 1 and 5 based on the PARM data. If the data is between 1 and 5, the validation server 100 returns a positive indication to client 400. If the input data is not between 1 and 5, the validation server 100 returns a negative indication to client 400.

Next, according to the example depicted in FIG. 2, the validation server 100 performs validation service on validation requests for the data input for date available, which has been tagged DATE_AVL. Here, database 200 includes one rule in the FIELD view for data tagged DATE_AVL. Accordingly, validation server 100 performs a Java-based IsBetween function on the input data tagged DATE_AVL to check if the data is between Jun. 1, 2002 and Sep. 1, 2002. Here again, server 100 provides an appropriate response to client 400. In other embodiments, further services may be provided in response to a positive, or negative, result, such as additional data validations, or the generation of further functions.

Referring again to FIG. 2, next, LD ORD 400 requests validation service on data related to the date of expiration for the requested telephone service. This data has been tagged DATE_EXP. The priority of rules 500 indicates that there are no rules in the FIELD view, i.e., there are no validation functions, for DATE_EXP. Therefore, the validation application server 100 looks to the next level of rules: the CLASS view. Referring to the exemplary rules table 500, there are two rules in the CLASS view for DATE: NotEmpty and IsValidDate. Accordingly, the application server 100 will read the execution sequences to determine which Java function to perform first. Java function NotEmpty has an execution sequence of "1" and Java function IsValidDate has an execution sequence of "5". Based on this sequence of execution set forth in the CLASS view, the validation server 100 executes first the NotEmpty function and then the IsValidDate function on the data. As will be appreciated by those skilled in the art, in this example, if there were no DATE rules, validation application server 100 would look for GLOBAL rules in the GLOBAL-view table. In the preferred embodiment, at least a NotEmpty validation function exists for the GLOBAL rules.

As will also be appreciated, by utilizing a centrally located storage system of dynamically maintainable validation rules, the present invention provides greater flexibility than known systems. For example, in the exemplary example discussed above, system administration 300 (FIG.

1) can update the PARM data for the DATE_AVL rule and, accordingly, all applications 400 requesting validation services for data related to DATE_AVL are immediately updated.

In some instances, the number of validation requests may be large depending on the number n of application clients 400 using the server 100. Constant database 200 reads may cause delays in validation service. Therefore, in one exemplary embodiment, the validation server 100 will read the database 200 data 500 into memory on startup. Updates to the validation rules and values stored in the data tables can occur after system start up.

Two exemplary methods to handle dynamic table updates are described below. The first method is to restart the validation application server 100 each night during a maintenance window. This approach is a simple restart of the validation server. The application itself would not have to restart since it could detect the lost connection to the validation server and reconnect. This would be seamless to the applications and end user of the applications. Another exemplary method involves creating a refresh function in the validation server 100. Preferably the server 100 will use a REFRESH_HOURS parameter. The memory tables will be updated from the database 200 based on this parameter. Preferably, the REFRESH_HOURS will be greater than 8. As will be appreciated, keeping the data 500 in the application server 100 memory will improve validation performance and allow or maintaining the dynamic nature of the validation routines.

The most generic field type in Java is the string. In the preferred embodiment, all data passed to the validation server 100 will be treated as a string. This will allow applications 400 to change to more generic data without impact. This embodiment will provide an interface that is as generic as possible by establishing the interface as Strings (ASCII). An example of this concept is set forth below.

As an example, assume that a business requirement was originally for an integer value for the Class of Service variable. However, since the integer values can be type cast to String and passed to the validation server 100, modifications to the rules can be made quickly. Modifications to types would cause the validation server 100 to understand application knowledge and not data values and validation rules. Testing with the legacy system determines that the value of NumberOfTelephoneLines may also be a single alpha character in some legacy systems. According to the present invention, since the variable is stored as a string the client code is not affected. Accordingly, the validation functions in the data table can be changed to an IsMember method instead of an IsBetween method. The validation value data will include all possible valid data values. This will change the validation from a check between two integer values (e.g., a number between 1 and 5) to a check for a member of the a set (e.g., 1, 2, 3, 4, 5, A, T, Y). This could be done without disturbing the running applications that utilize this validation service.

Proposed ValidatorClient CLASS methods include:

TABLE 3

| Method | Return Type | Arguments | Description |
| --- | --- | --- | --- |
| ValidatorClient | ValidatorClient | Application Name, Application Version, Application User | Class constructor. Also used to initialize Application data for subsequent calls |
| ~ValidatorClient | ~ValidatorClient | | Class destructor. |
| set | | Application Name, Application Version, Application User | Sets application data settings for the object. |
| isValid | Boolean | Field Name, Field Value | Sends data to the validator server for work. If the data passes the rules a TRUE is returned. Otherwise; a FALSE is returned. |
| IsValid | VRHashTable | FVHashTable | Sends data to the validator server for work. If the data passes the rules a TRUE is returned. Otherwise; a FALSE is returned. |
| RuleType | Integer | Field Name | Gets the rule type used for validation - 0 = None, 1 = Field, 2 = Class, 3 = Global {Used primarily for development} |

In one embodiment, the client servers 400 can minimize network traffic using Field Value Hashtables. As will be appreciated, this will reduce the number of transactions to the validation application server 100 and improve performance. One call to the server 100 can contain an entire set of data in need of validation. The individual validation statuses will also be returned in a Hashtable. Preferably, the IsValid method is used to determine if all the data passed validation. If not, individual methods can be checked to determine problem areas.

Proposed FVHashTable CLASS methods include:

TABLE 4

| Method | Return Type | Arguments | Description |
| --- | --- | --- | --- |
| FVHashTable | FVHashTable | | Constructor for a Field Value HashTable object. |
| AddToSet | Boolean | Field Name, Field Value | Add a field value pair to the FVHashTable. Return True on success. |
| RemoveFromSet | Boolean | Field Name | Remove a field value pair from the FVHashTable. Return True on success. |
| MemberValue | String | Field Name | Return the value of the specified key. |

Proposed VRHashTable CLASS methods:

TABLE 5

| Method | Return Type | Arguments | Description |
| --- | --- | --- | --- |
| VrashTable | VRHashTable | | Constructor for a Value Return HashTable object. |
| AddToSet | Boolean | String Field Name, Boolean Valid | Add a field value pair to the VRHashTable. Return True on success. |
| RemoveFromSet | Boolean | String Field Name, | Remove a field value pair from the VRHashTable. Return True on success. |
| MemberValue | Boolean | Field Name | Return the validation status value of the specified key. |
| IsValid | Boloean | | Returns a True if all values for the set are True. Otherwise; returns a False. |

As will be appreciated, according to the embodiments discussed above, two devices that are coupled can engage in direct communications, in indirect communications or a combination thereof. Embodiments of the present invention relate to data communications via one or more networks. The data communications can be carried by one or more communications channels of the one or more networks. Examples of a network include a Wide Area Network (WAN), a Local Area Network (LAN), the Internet, a wireless network, a wired network, a connection-oriented network, a packet network, an Internet Protocol (IP) network, or a combination thereof. A network can include wired communication links (e.g., coaxial cable, copper wires, optical fibers, and so on), wireless communication links (e.g., satellite communication links, terrestrial wireless communication links, wireless LANs, and so on), or a combination thereof.

In accordance with an embodiment of the present invention, instructions adapted to be executed by a processor to perform a method are stored on a computer-readable medium. The computer-readable medium can be a device that stores digital information. For example, a computer-readable medium includes a hard disk, a floppy disk, a tape and a compact disc read-only memory (CD-ROM), all as known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further validation (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A client-server computer system comprising:
a client application server that utilizes data in a particular form and generates a validation request for validation of the data and wherein the request includes the data in an initial form;
an application server accessible by a plurality of client application servers via a plurality of application software protocols, wherein said application server provides a data validation service on the data received from the client application server in response to receiving the validation request from the client application server, wherein the data validation service compares the data in the initial form to validation parameters stored in a hierarchical, table-based system of a plurality of rules organized into at least a FIELD view, a CLASS view and a GLOBAL view, wherein the FIELD view is the view of first priority and contains validation parameters applicable to a specific field, the CLASS view is the view of second priority and contains validation parameters applicable to a class of fields and the GLOBAL view is the default view when there is no match to the data in the FIELD and CLASS views wherein further the rules included in each of the FIELD view, CLASS view and GLOBAL view are prioritized in a predetermined execution sequence and returns to the same client application server that generated the validation request an indication of valid or invalid, wherein further the data in the initial form is determined to be in a valid format when a data item specified in the data in the initial form has a non-empty table field, the data item specified in the data in the initial form is in a valid data format, and when the data item falls within a set of range of validation values; and
a storage mass coupled to said application server for storing a system of dynamically maintainable validation functions for performing said validation service.

2. A client-server computer system according to claim 1, wherein said storage mass comprises a database.

3. A client-server computer system according to claim 1, wherein said validation functions are represented by a storage schema in the form of Lightweight Directory Access Protocol.

4. A client-server computer system according to claim 2, wherein said database contains a table-based system of rules organized into at least three hierarchically-organized views.

5. A client-server computer system according to claim 3, wherein the storage schema represented by Lightweight Directory Access Protocol represents a table-based system of rules organized into at least three hierarchically-organized views.

6. A client-server computer system according to claim 2, wherein said database stores validation functions stored as hierarchically-organized views that are dynamically updatable by an external administrator.

7. A client-server computer system according to claim 3, wherein said storage schema represented by Lightweight Directory Access Protocol represents validation functions stored as hierarchically-organized views that are dynamically updatable by an external administrator.

8. A client-server computer system according to claim 4, wherein said application server and said database are centrally located to said plurality of client application servers and said validation functions are maintainable by a remote administrator.

9. A client-server computer system according to claim 5, wherein said application server and said storage schema represented by Lightweight Directory Access Protocol are centrally located to said plurality of client application servers and said validation functions are maintainable by a remote administrator.

10. An application operating within a computing device server comprising:
 a plurality of client application servers, each client application server utilizing data in a particular form and each client application server generating separate requests for validation of that data wherein the requests include the data in an initial form;
 means for performing validation services in response to validation requests from said plurality of client application servers, said means for performing validation services being coupled to said plurality of client application servers and the means for performing validation services performing a comparison of the data in the initial form to validation parameters stored in a hierarchical, table-based system of a plurality of rules organized into at least a FIELD view, a CLASS view and a GLOBAL view, wherein the FIELD view is the view of first priority, the CLASS view is the view of second priority and the GLOBAL view is the default view when there is no match to the data in the FIELD and CLASS views, wherein further the rules included in each of the FIELD view, CLASS view and GLOBAL view are prioritized in a predetermined execution sequence and returning to the same client application server that sent the request an indicating of valid or invalid, wherein further the data in the initial form is determined to be in a valid format when a data item specified in the data in the initial form has a non-empty table field, the data item specified in the data in the initial form is in a valid data format, and when the data item falls within a set of range of validation values; and,
 means for storing and dynamically maintaining a hierarchically-organized system of validation rules coupled to said means for performing validation services wherein the validation rules are implemented by the means for performing validation in order to compare the data in the initial form to the reference.

11. An application server according to claim 10, wherein said means for storing validation rules comprises a database.

12. An application server according to claim 10, wherein said validation rules are stored in a schema in the form of Lightweight Directory Access Protocol.

13. An application server according to claim 11, wherein said database contains a table-based system of rules organized into at least three hierarchically-organized views.

14. An application server according to claim 12, wherein said schema in the form of Lightweight Directory Access Protocol represents a table-based system of rules organized into at least three hierarchically-organized views.

15. An application server according to claim 11, wherein said database stores validation functions stored as hierarchically-organized views that are dynamically updatable by an external administrator.

16. An application server according to claim 12, wherein said storage schema represented by Lightweight Directory Access Protocol represents validation functions stored as hierarchically-organized views that are dynamically updatable by an external administrator.

17. An application server according to claim 13, wherein said means for performing validation services and said database are remotely located to said plurality of client application servers and wherein said validation rules are maintainable by a remote administrator.

18. An application server according to claim 14, wherein said application server and storage schema in the form of Lightweight Directory Access Protocol are remotely located to said plurality of client application servers and further comprises means for maintaining said validation functions.

19. A system for providing an application service, the system comprising:
 an application server that receives requests for data validation and that performs data validation by comparing data of the requests that is in an initial form to validation parameters stored in a hierarchical table-based system of a plurality of rules organized into at least a FIELD view, a CLASS view and a GLOBAL view, wherein the FIELD view is the view of first priority, the CLASS view is the view of second priority and the GLOBAL view is the default view when there is no match to the data in the FIELD and CLASS views wherein further the rules included in each of the FIELD view, CLASS view and GLOBAL view are prioritized in a predetermined execution sequence and returns to a same application that requested the data validation an indication of valid or invalid, wherein further the data in the initial form is determined to be in a valid format when a data item specified in the data in the initial form has a non-empty table field, the data item specified in the data in the initial form is in a valid data format, and when the data item falls within a set of range of validation values;
 a plurality of applications coupled to the application server, the plurality of applications utilizing the data in a particular form corresponding to the validation parameters and each application sending the data in the initial form to the application server with a separate request by each application for data validation;
 one or more application programming interfaces, the one or more application programming interfaces for coupling said plurality of applications to said application server and for coupling the data validation requests and data via a plurality of computer network protocols; and
 at least one dynamically-maintainable data schema coupled to said application server for providing access to data validation functions employed by the application server to compare the initial form of the data to the reference.

20. A system according to claim 19, wherein said data schema is at least partially in the form of a database.

21. A system according to claim 19, wherein said data schema comprises validation functions in the form of Lightweight Directory Access Protocol.

22. A system according to claim 20, wherein said data schema contains a table-based system of rules organized into a plurality of hierarchically-organized views.

23. A system according to claim 21, wherein said data schema in the form of Lightweight Directory Access Protocol represents a table-based system of rules organized into a plurality of hierarchically-organized views.

24. A system according to claim 20, wherein said data schema stores validation functions stored as hierarchically-organized views.

25. A system according to claim 21, wherein said data schema in the form of Lightweight Directory Access Protocol represents validation functions stored as hierarchically-organized views that are dynamically updatable.

26. A system according to claim 22, wherein said application server and said data schema are remotely located to a plurality of client application servers and said validation rules are maintainable by a remote administrator.

27. A system according to claim 23, wherein said application server and said schema in the form of Lightweight Directory Access Protocol are remotely located to a plurality of client application servers and said validation rules are maintainable by a remote administrator.

28. The system of claim 26, wherein said system couples data between the application and said application server in the form of a string.

29. The system of claim 27, wherein said application server treats data passed to it as a string.

30. The system of claim 28, wherein the said application server receives data from said application in the form of a hashtable.

31. A system for providing data validation service on requests from applications running a plurality of software protocols, the system comprising:
 a data network;
 an application server, the application server in communication with the data network to receive data within validation requests for validation of the initial form of the data and wherein the application server compares the initial form of the data to validation parameters stored in a hierarchical table-based system of a plurality of rules organized into at least a FIELD view, a CLASS view and a GLOBAL view, wherein the FIELD view is the view of first priority, the CLASS view is the view of second priority and the GLOBAL view is the default view when there is no match to the data in the FIELD and CLASS views wherein further the rules included in each of the FIELD view, CLASS view and GLOBAL view are prioritized in a predetermined execution sequence and returns to a same application that requested the data validation an indication of valid or invalid, wherein further the data in the initial form is determined to be in a valid format when a data item specified in the data in the initial form has a non-empty table field, the data item specified in the data in the initial form is in a valid data format, and when the data item falls within a set of range of validation values;
 at least one application that utilizes the data in a particular form corresponding to the validation parameters, the application in communication with the application server, the application providing validation requests and data in the initial form to the application server via the data network and receiving the indication of valid or invalid back from the application server;
 one or more open application programming interfaces, the one or more application programming interfaces capable of handling a plurality of software protocols and in communication with the application server and said applications; and
 a data schema in communication with said data network, for storing validation functions, and accessible by said application server, wherein said application server processes the validation requests and returns a response of valid or invalid to the applications according to said validation functions stored in said data schema for comparing the initial form of the data to the reference.

32. A system according to claim 31, wherein said data schema comprises a database.

33. A system according to claim 31, wherein said validation functions are stored in the format of Lightweight Directory Access Protocol.

34. A system according to claim 32, wherein said database contains a table-based system of rules organized into hierarchically-organized views.

35. A system according to claim 33, wherein said schema in the form of Lightweight Directory Access Protocol represents a table-based system of rules organized into hierarchically-organized views.

36. A system for providing an application service, the system comprising:
 means for receiving a service request from a customer application computer, wherein the customer application computer requests a validation service to determine whether data in an initial form is valid or invalid, wherein further the data in the initial form is determined to be in a valid format when a data item specified in the data in the initial form has a non-empty table field, the data item specified in the data in the initial form is in a valid data format, and when the data item falls within a set of range of validation values;
 means for sending a validation request instruction to an application server corresponding to data in the initial form to be validated;
 means for sending a service request from the application server to a database, the service request based at least in part on the validation request;
 means for performing hierarchically-based validation services on the data that is in the initial form by comparing the initial form of the data to validation parameters stored in a hierarchical table-based system of a plurality of rules organized into at least a FIELD view, a CLASS view and a GLOBAL view, wherein the FIELD view is the view of first priority, the CLASS view is the view of second priority and the GLOBAL view is the default view when there is no match to the data in the FIELD and CLASS views wherein further the rules included in each of the FIELD view, CLASS view and GLOBAL view are prioritized in a predetermined execution sequence;
 means for remotely updating said database based on current validation requirements of said system;
 means for sending a validation result to the same customer application computer that sent the request for validation and including the indication of whether the data is valid or invalid based on whether the initial form matched the validation parameters from the application server to said customer based at least in part on the validation request; and
 means for providing a response to said system from said customer application computer in response to said validation result.

37. A computer-readable medium storing a plurality of instructions executed by a processor for providing an application service, the plurality of instructions comprising instructions to:
receive a service request from a customer data device, the customer data device including data that is in an initial form to be validated by determining whether the initial form of the data matches validation parameters stored in a hierarchical, table-based system of a plurality of rules organized into at least a FIELD view, a CLASS view and a GLOBAL view, wherein the FIELD view is the view of first priority, the CLASS view is the view of second priority and the GLOBAL view is the default view when there is no match to the data in the FIELD and CLASS views, wherein further the rules included in each of the FIELD view, CLASS view and GLOBAL view are prioritized in a predetermined execution sequence and corresponding to a particular form utilized by the customer data device;
generate a service session instruction, the service session instruction based at least in part on the service request;
send the service session instruction to one or more open application programming interfaces, the service session instruction corresponding to one or more data validation requests from said customer data device;
perform one or more validation functions based on stored rules in a database by comparing the initial form of the data to the validation parameters; and
send a validation service response to the same customer data device that provided the request where the response includes the indication of valid or invalid, wherein further the data in the initial form is determined to be in a valid format when a data item specified in the data in the initial form has a non-empty table field, the data item specified in the data in the initial form is in a valid data format, and when the data item falls within a set of range of validation values, the validation service response being based on the service request.

38. A medium according to claim 37, wherein said database comprises a database and further comprises an instruction to load said database into a memory upon startup of said application service.

39. A medium according to claim 37, wherein said validation functions are stored in the format of Lightweight Directory Access Protocol and further comprise an instruction to load said database into a memory upon startup of said application service.

* * * * *